United States Patent
Saegusa et al.

(10) Patent No.: US 7,393,915 B2
(45) Date of Patent: Jul. 1, 2008

(54) METHOD FOR PRODUCING POLYORGANOSILOXANE-CONTAINING RESIN

(75) Inventors: Kazunori Saegusa, Kobe (JP); Tomoyuki Yoshimi, Hyogo (JP); Hiroshi Tone, Akashi (JP)

(73) Assignee: Kaneka Corporation, Osaka (JP)

( * ) Notice: Subject to any disclaimer, the term of this patent is extended or adjusted under 35 U.S.C. 154(b) by 277 days.

(21) Appl. No.: 10/553,952

(22) PCT Filed: Apr. 14, 2004

(86) PCT No.: PCT/JP2004/005345

§ 371 (c)(1),
(2), (4) Date: Oct. 19, 2005

(87) PCT Pub. No.: WO2004/096876

PCT Pub. Date: Nov. 11, 2004

(65) Prior Publication Data

US 2006/0258821 A1    Nov. 16, 2006

(30) Foreign Application Priority Data

Apr. 28, 2003    (JP) .............................. 2003-123751

(51) Int. Cl.
*C08G 77/442*    (2006.01)
(52) U.S. Cl. .................. 528/480; 528/499; 528/500; 524/801; 524/802; 524/806; 524/837; 525/100; 526/279

(58) Field of Classification Search ...................... None
See application file for complete search history.

(56) References Cited

U.S. PATENT DOCUMENTS

| | | | |
|---|---|---|---|
| 3,073,380 A | | 1/1963 | Palmason |
| 3,469,617 A | | 9/1969 | Palmason |
| 4,096,160 A | | 6/1978 | Ashby |
| 5,164,442 A | * | 11/1992 | Itoh et al. .................. 524/492 |
| 5,532,302 A | * | 7/1996 | Nakanishi et al. ........... 524/143 |
| 2003/0059393 A1 | * | 3/2003 | Wrolson et al. .......... 424/70.12 |

FOREIGN PATENT DOCUMENTS

| | | |
|---|---|---|
| EP | 0 982 346 A1 | 3/2000 |
| EP | 1 231 235 A2 | 8/2002 |
| JP | 9-95536 A | 4/1997 |
| JP | 2000-17029 A | 1/2000 |
| JP | 2000-103857 A | 4/2000 |
| JP | 2000-256464 A | 9/2000 |
| JP | 2002-201243 A | 7/2002 |
| JP | 2002-249582 A | 9/2002 |
| JP | 2002-284877 A | 10/2002 |

OTHER PUBLICATIONS

Abstract for JP 10-204251 published Aug. 4, 1998.*

* cited by examiner

*Primary Examiner*—Marc S Zimmer
(74) *Attorney, Agent, or Firm*—Sughrue Mion, PLLC

(57) ABSTRACT

The object of this invention is to provide a new process for producing polyorganosiloxane-containing resin which comprises reducing volatile siloxane, characterized in that polyorganosiloxane-containing resin in a slurry state is heat-stripped in producing polyorganosiloxane-containing resin.

7 Claims, No Drawings

METHOD FOR PRODUCING POLYORGANOSILOXANE-CONTAINING RESIN

RELATED APPLICATION

This application is a national stage of PCT application PCT/JP2004/005345 filed on Apr. 14, 2004, claiming priority based on Japanese Application No. 2003-123751 filed on Apr. 28, 2003, the contents of which are incorporated herein by reference in their entirety.

BACKGROUND ART

The present invention relates to a process for producing polyorganosiloxane-containing resin, polyorganosiloxane-containing resin obtained by the process, and a flame-retardant comprising the polyorganosiloxane-containing resin.

The present invention also relates to a method of separating volatile siloxane distilled away in the process for producing polyorganosiloxane.

TECHNICAL FIELD

Polyorganosiloxane or polyorganosiloxane-containing resin is utilized in various uses including improvement in impact resistance and flame retardancy of thermoplastic resin and for use in paints and coatings by virtue of physical properties based on excellent low-temperature characteristics of the polyorganosiloxane component, its specific reactivity, etc.

In consideration of the environment and the safety, from the viewpoint of handling properties represented by viscosity and heat transfer efficiency, polyorganosiloxane-containing resin which can be produced, stored and handled in the form of a dispersion in an aqueous medium is highly desired thus forming a big market.

As a method of producing an emulsion comprising polyorganosiloxane finely dispersed in an aqueous medium, a method of emulsion polymerization of cyclic siloxane and alkoxy silane under acidic or basic conditions is generally known (U.S. Pat. No. 2,891,920 etc.).

This reaction is an equilibrium reaction between polycondensation of forming a siloxane linkage (Si—O—Si) from silanol (Si—OH) and depolymerization reaction by hydrolysis so that when the polymerization is concluded, that is, when equilibrium is reached, low-molecular volatile siloxane is formed particularly in the presence of an aqueous medium. This volatile siloxane will not be significantly reduced even if polymerization of vinyl monomers is further conducted.

Accordingly, when polyorganosiloxane or polyorganosiloxane-containing resin is coagulated with a salt, dehydrated and dried or it is isolated from an emulsion etc. by spray drying or made free of an aqueous medium by coating etc., the volatile siloxane together with the aqueous medium is dissipated as exhaust gas into the air, and is thus not only wasteful as a raw material but may also exert adverse influence on the performance of a coating etc.

Accordingly, many studies for obtaining an emulsion with reduced volatile siloxane have been conducted.

It can be easily anticipated that (modified) silicone oil or a siloxane oligomer serving as a starting material is extracted with a solvent (JP-A 07-330905) or heated under reduced pressure (JP-A 07-278473), or extracted with sub-critical or super-critical carbon dioxide (JP-A 06-107796), to remove low-molecular siloxane, and then finely dispersed in an aqueous medium forcibly under high-pressure shearing by a mechanical method to produce an emulsion.

A method wherein this emulsion is further subjected to condensation reaction and then neutralized to stop the polymerization/depolymerization reaction is also known (JP-A 2001-288269, JP-A 11-222554).

The polyorganosiloxane emulsion obtained by these methods hardly contains low-molecular volatile siloxane, but the emulsion is poor in stability and may cause a problem of separation of polyorganosiloxane from the aqueous medium in long-time storage.

Further, the particle diameter distribution of the resulting emulsion is broad, and thus there is a problem that the subsequent graft modification reaction for producing polyorganosiloxane-containing resin can not proceed homogeneously.

In a method of obtaining a polyorganosiloxane emulsion without deterioration in stability and separation of polyorganosiloxane even in long-time storage, that is, a method of emulsion polymerization of cyclic organosiloxane in the presence of a nonionic surfactant/ionic surfactant/polymerization catalyst, an example wherein volatile siloxane is reduced is disclosed (European Patent No. 459500).

However, volatile siloxane is not always reduced. In a method of simultaneously using multifunctional (trifunctional or more) silane while controlling the gel fraction, the same example is also disclosed (U.S. Pat. No. 5,661,215).

However, even if the gel fraction of the resulting polyorganosiloxane is controlled, the finally obtained polyorganosiloxane-containing resin or its composition gives a brittle molded product, thus failing to exhibit sufficient mechanical strength in some cases, which is considered attributable to the reduction in the probability of formation of volatile siloxane by introduction of a crosslinked structure into the siloxane polymer chain.

An alternative method of obtaining an emulsion with reduced volatile siloxane, wherein heat stripping is conducted, is disclosed (U.S. Pat. No. 4,600,436). However, JP-A 2002-249582 shows that in the above method by a batch method, volatile siloxane can be reduced, but the viscosity (that means, the molecular weight) of the polymer in the emulsion is reduced.

The invention described in JP-A 2002-249582 provides a means of simultaneously solving the problem of the reduction in molecular weight, which is concerned with a technique of effecting heat stripping in a short time by continuously circulating a polyorganosiloxane emulsion together with a stripping gas in a continuous circulation unit. In this method, however, a special unit for continuous stripping is required.

A method of solving the problem of a reduction in the molecular weight of polyorganosiloxane by batch stripping not requiring a special unit for continuous stripping is disclosed in JP-A 2002-284877. In this technique, there is disclosed a method wherein low-molecular siloxane such as cyclic siloxane is subjected to suspension polymerization in the presence of a polymerization catalyst to give an emulsion, the polymerization catalyst is neutralized, then the amount of volatile siloxane is reduced by batch stripping, and an additional polymerization catalyst is added again to resume condensation reaction and then neutralized.

In this method, the procedure of addition of the polymerization catalyst and neutralization thereof should be repeatedly carried out, thus making the procedure troublesome, and from the viewpoint of productivity, there is demand for improvements in this method.

An alternative method wherein diatomaceous earth is added to a polyorganosiloxane latex, to adsorb low-molecular siloxane under stirring, and then removed by filtration is disclosed (U.S. Pat. No. 5,922,108). In this method, a method of treating diatomaceous earth which has adsorbed low-molecular siloxane should be secured.

The prior-art techniques described above have an effect of reducing volatile low-molecular siloxane, but the polyorganosiloxane or polyorganosiloxane-containing resin should be handled in the form of an emulsion, and none of these techniques disclose a method wherein volatile siloxane is reduced in another form, that is, a slurry state.

For example, U.S. Pat. No. 5,922,108 discloses a method wherein a fluid containing hydrocarbons such as pentane and volatile siloxane such as exhaust gas generated at the time of production of polyorganosiloxane-containing resin is passed through a column packed with diatomaceous earth (Foil) to adsorb the volatile siloxane and hydrocarbons, then the hydrocarbons only are desorbed with dry air, thereafter volatile siloxane is desorbed with water vapor, water etc. and recovered, and the diatomaceous earth in the column is recycled by drying. This method is superior in that both hydrocarbons and volatile siloxane can be separated.

On one hand, there is a problem that special facilities are required, and large facilities are necessary for industrial use, and facilities for finally separating volatile siloxane from the aqueous medium are separately necessary. In the emulsion system not using hydrocarbons as solvent, intended in the present invention, there is demand for an easier method.

DISCLOSURE OF INVENTION

An object of the present invention is to provide a novel process for producing polyorganosiloxane-containing resin with reduced volatile low-molecular siloxane, polyorganosiloxane-containing resin obtained by the process, and a flame-retardant comprising the polyorganosiloxane-containing resin. A further object is to simultaneously provide a method of both separating and recovering volatile siloxane distilled away in the process for producing polyorganosiloxane-containing resin.

The present inventors made extensive study to solve the problem described above, and as a result, thus found that volatile siloxane can be reduced by heat stripping polyorganosiloxane-containing resin slurry, and the present invention was thereby completed.

That is, the present invention relates to:

(1) A process for producing polyorganosiloxane-containing resin, comprising heat stripping a polyorganosiloxane-containing resin in a slurry state to obtain a polyorganosiloxane containing resin with reduced volatile siloxane.

(2) The process for producing polyorganosiloxane-containing resin as described in the above, wherein the polyorganosiloxane-containing resin in a slurry state is obtained by coagulating polyorganosiloxane-containing resin in a latex state.

(3) The process for producing polyorganosiloxane-containing resin as described in the above, wherein the polyorganosiloxane-containing resin is a polyorganosiloxane-based graft copolymer obtained by polymerizing monofunctional and/or multifunctional radical polymerizable monomers in one or more step in the presence of polyorganosiloxane-based particles.

(4) The process for producing polyorganosiloxane-containing resin as described in any one of the above, which comprises heat stripping at 100° C. or more.

(5) The process for producing polyorganosiloxane-containing resin as described in anyone of the above, which involves feeding water vapor to the slurry.

(6) The process for producing a polyorganosiloxane-containing resin composition as described in any one of the above, wherein the volatile siloxane is separated by cooling volatile siloxane-containing distillate components.

(7) The process for producing polyorganosiloxane-containing resin as described in the above, wherein the volatile siloxane is separated by cooling volatile siloxane-containing distillate components to 17° C. or less.

(8) The process for producing polyorganosiloxane-containing resin as described in the above, wherein the volatile siloxane upon separation is separated as solid.

(9) Polyorganosiloxane-containing resin with reduced volatile siloxane, which is produced by the process as described in the above.

(10) A flame-retardant comprising the polyorganosiloxane-containing resin as described in the above.

(11) A resin composition comprising the polyorganosiloxane-containing resin as described in the above and at least one resin selected from thermoplastic resin, thermosetting resin and elastomer.

The present invention is characterized in that polyorganosiloxane-containing resin in a slurry state is heat-stripped to reduce volatile siloxane.

The polyorganosiloxane-containing resin in a slurry state or the resin composition used in the present invention is preferable because it can be obtained by coagulating e.g. polyorganosiloxane-containing resin in a latex state by salting out with a salt such as calcium chloride, magnesium chloride or aluminum chloride or by treating it with an acid such as hydrochloric acid.

In this case, the polyorganosiloxane-containing resin can be coagulated together with another resin for example a latex or slurry of polymethyl methacrylate resin, polybutyl (meth) acrylate resin or polystyrene resin. The latex referred to herein is a concept including emulsion.

Heat stripping may be accompanied by foaming in a liquid surface of slurry, and for the purpose of preventing foaming, a defoaming agent can be added if necessary. The slurry particle diameters are relatively thicker than the thickness of a foam membrane, to make the surface tension of foam readily uneven to exert a significant preventing effect on foaming.

In particular, the slurry obtained by coagulating the polyorganosiloxane-containing resin in a latex state lowers significantly the activity of a surfactant present in the latex during coagulation, to make foaming less than in stripping of the corresponding emulsion, thus reducing the amount of a defoaming agent if any or making use of a defoaming agent unnecessary. When a defoaming agent is used, the type and amount of the defoaming agent are not limited, and examples thereof include a higher alcohol, a silica/silicone oil/surfactant-containing emulsion defoaming composition, an ethylene oxide-propylene oxide block copolymer and the like.

Using facilities such as a foam separator, a method of defoaming by contacting with steam or cooling can be adopted.

The weight-average particle diameter of the slurry is not limited, but is preferably 1 µm or more, more preferably 10 µm or more, particularly preferably 50 µm or more, and the upper limit is not particularly limited. When the particle diameter is smaller than 1 µm, the resin is dispersed in a colloidal state, thus making separation from an aqueous medium difficult or easily causing foaming in some cases. The shape of the slurry is not limited, and may be not only spherical but also amorphous, and is often amorphous when slurry is formed by coagulation of the emulsion. In the present invention, the volume-average particle diameter can be substituted for the weight-average particle diameter.

The polyorganosiloxane-containing resin in this invention is not limited, but is preferably a graft copolymer wherein components which help polyorganosiloxane disperse well in the resin have been grafted in order to disperse it well in matrix upon compounded with thermoplastic resin, thermosetting resin or elastomer and to confer functions such as impact resistance and if necessary flame retardancy.

As disclosed in for example JP-A 2000-226420 and JP-A 2000-834392, the polyorganosiloxane-containing graft copolymer is obtained by polymerizing monofunctional polymerizable monomers such as (meth)acrylates such as methyl (meth)acrylate and butyl (meth)acrylate, aromatic vinyl compounds such as styrene, vinyl cyanide compounds such as acrylonitrile, and (alkyl)amide of (meth)acrylic acids such as (meth)acrylamide and/or multifunctional radical polymerizable monomers for example allyl esters such as allyl (meth)acrylate and diallyl phthalate, vinyl benzene etc. in one or more steps in the presence of polyorganosiloxane-based particles preferably in a latex state, the particles being obtained by polymerizing cyclic siloxane such as 1,3,5,7-octamethyl cyclotetrasiloxane (D4) and bifunctional or more alkoxysilane such as dimethyl dimethoxysilane and tetrapropyloxysilane (TPOS) with a graft crosslinking agent such as 3-methacryloyloxypropyldimethoxymethylsilane and 3-mercaptopropyldimethoxymethylsilane in the presence of an aqueous medium, a surfactant such as sodium dodecylbenzenesulfonate (SDBS) and a polymerization catalyst for example an organic acid such as dodecylbenzenesulfonic acid (DBSA), an inorganic acid such as sulfuric acid and hydrochloric acid, and a base such as sodium hydroxide.

The weight-average particle diameter of the emulsion particles of the polyorganosiloxane-containing graft copolymer is preferably 0.01 μm or more, more preferably 0.03 μm or more, still more preferably 0.05 μm or more, and preferably 20 μm or less, more preferably 2 μm or less, still more preferably 0.8 μm or less. The emulsion particles with their diameter less than 0.01 μm may be hardly produced, while those with their diameter larger than 20 μm may be poor in storage stability. For the purpose of narrowing the width of the particle size distribution of the polyorganosiloxane-based particles, it is possible to use a latex comprising seed particles having a weight-average particle diameter of preferably 0.06 μm or less or a weight-average molecular weight (Mw) of preferably 10,000 or less, produced by using butyl (meth)acrylate and/or styrene in polymerization of cyclic siloxane and/or alkoxysilane. Before the monofunctional and/or multifunctional radical polymerizable monomers are polymerized, the latex particles can be enlarged by adding an inorganic metal salt such as sodium sulfate to the organosiloxane particles-containing latex.

When dodecylbenzenesulfonic acid or its sodium salt etc. which cannot be coagulated by acid treatment is used as a surfactant and a polymerization catalyst, the method of salting out described above can be used.

When the polyorganosiloxane-containing resin slurry is subjected to heat stripping in the process of the present invention, either a batch or continuous method may be used. In the batch method, the slurry before stripping treatment is introduced if necessary into a pressure-resistant batch distillation apparatus, or the polyorganosiloxane-containing resin emulsion in a latex state is introduced into the batch distillation apparatus, followed by coagulation thereof by salting out.

Thereafter, the slurry therein is heated and maintained under the temperature condition of preferably 100° C. or more, more preferably 120° C. or more, still more preferably 140° C. or more and preferably 180° C. or less, more preferably 160° C. or less, still more preferably 150° C. or less. At a higher treatment temperature, volatile siloxane can be reduced effectively in a shorter time. However, when the treatment temperature is higher than 180° C., the polyorganosiloxane may be decomposed. When the treatment temperature is lower than 100° C., a longer time is necessary for volatile siloxane to be sufficiently reduced, or the volatile siloxane may not be reduced to a satisfactory level.

Heating of the slurry in the apparatus and maintenance of the temperature of the slurry can be carried out by a method of heating an external jacket of the apparatus, a method of heating with a closed steam coil arranged in the apparatus, a method of introducing water vapor directly into the slurry, or a combination thereof. Introduction of water vapor is preferable because higher efficiency of vaporization of volatile siloxane can be achieved, and using a steam spray having suitably arranged pores, water vapor is preferably supplied through many pores into the slurry, or water vapor is supplied from a considerably deep place under the liquid surface of the slurry, preferably from the bottom of the batch distillation apparatus.

While maintained at the above temperature is discharged the volatile siloxane as a distillate component together with water vapor from an upper part of the batch distillation apparatus. In this case, it is not necessary that the amount of the fluid supplied is completely equal to the amount of the fluid discharged, but preferably the water content of the slurry is controlled such that excess water is not removed.

For control of the water content, it can be employed a method of directly introducing new water into the batch distillation apparatus, a method where water recovered from the distillate component by a method described later can be returned to the batch distillation apparatus, and a method of controlling water content by supplying water vapor is preferably used because functions of both heating and water supply can be simultaneously achieved.

The time (treatment time) in which the slurry is kept at the above temperature while distillate components are discharged from an upper part of the batch distillation apparatus is not particularly limited, and the treatment time is preferably 4 hours or less, more preferably 2 hours or less, still more preferably 1 hour or less, still further preferably 45 minutes or less and preferably 10 minutes or more, more preferably 20 minutes or more, depending on the treatment temperature. When the treatment time is too short, volatile siloxane is not sufficiently reduced, while when the treatment time is too long, productivity is lowered, and degradation of polyorganosiloxane may undesirably occur.

When the slurry is left at rest, the resin component may be precipitated. In this case, there arises a problem that the efficiency of stripping maybe lowered, and the precipitated resin may be coarsening by fusion or adhering by fusion to an internal wall of the distillation apparatus. For the purpose of preventing this problem, the slurry is preferably continuously stirred throughout the process wherein the slurry is introduced into the batch distillation apparatus, or the polyorganosiloxane-containing resin in a latex state is introduced into the apparatus and coagulated, then heated and subjected to stripping treatment, and the slurry remaining therein is discharged.

After stripping treatment, the slurry remaining in the batch distillation apparatus comprises polyorganosiloxane-containing resin with a reduced content of volatile siloxane. If necessary, the slurry can be dehydrated and dried to recover the polyorganosiloxane-containing resin as powder or crumb.

When heat stripping is carried out in a continuous method, the polyorganosiloxane-containing resin in a slurry state is passed through a continuous circulation apparatus. The continuous circulation apparatus used may be in the form of a tube, a cylinder or a tank, and when a tubular apparatus is used, the apparatus may be in various forms such as a linear tube, a circular tube and a spiral tube.

When the apparatus in the form of a linear tube or a cylinder is used, the slurry can be passed through the apparatus for example in a perpendicular downward direction, a perpendicular upward direction, a horizontal direction etc. The apparatus is preferably in the form of a linear tube, a cylinder or a tank from the viewpoint of prevention of clogging with resin, or the apparatus is preferably in the form of a linear tube or a cylinder to reduce uneven treating time among individual slurry particles. When water vapor is fed for the same reason as in the batch method, the apparatus in the form of a perpendicular linear tube, cylinder or tank is preferably used.

In the continuous method, the temperature condition and time for stripping treatment are the same as in the batch method, and a continuous circulation apparatus of suitable size depending on necessary treatment time and throughput of the slurry is used. Heating may be carried out under the same conditions as in the batch method.

In the continuous method, distillate components containing volatile siloxane are discharged from an upper part of the continuous circulation apparatus, and polyorganosiloxane-containing resin slurry with a reduced content of volatile siloxane can be obtained from an discharging part of the continuous circulation apparatus.

Regardless of whether the batch or continuous method is used, the concentration of the polyorganosiloxane-containing resin slurry subjected to the treatment is preferably 1 wt % or more, more preferably 5 wt % or more, still more preferably 10 wt % or more and preferably 50 wt % or less, more preferably 30 wt % or less, still more preferably 20 wt % or less. When the concentration is too low, productivity and energy efficiency are low, while when the concentration is too high, the polyorganosiloxane-containing resin may be fused due to insufficient stirring in the case of the batch method or may cause clogging in the case of the continuous method.

The volatile siloxane distilled away with water vapor by the process of the present invention is a concept including siloxane compounds having a boiling point at atmospheric pressure. For example, siloxane compounds having a boiling point of 350° C. or less at atmospheric pressure can be mentioned. Depending on the used raw materials of polyorganosiloxane, the volatile siloxane includes, for example, hexamethyldisiloxane (MM), octamethyltrisiloxane (MDM), 1,3,5-hexamethylcyclotrisiloxane (D3), 1,3,5,7-octamethylcyclotetrasiloxane (D4), 1,3,5,7,9-decamethylcyclopentasiloxane (D5), 1,3,5,7,9,11-dodecamethylcyclohexasiloxane (D6), 1,3,5,7,9,11,13-tetradecamethylcycloheptasiloxane (D7), 1,3,5,7-octaphenylcyclotetrasiloxane, 1,3,5,7-tetramethyl-1,3,5,7-tetraphenylcyclotetrasiloxane etc. Compounds wherein methyl groups bonded to silicon atoms are partially replaced by functional groups such as mercaptopropyl group, methacryloyloxypropyl group, vinyl group, allyl group etc. derived from a graft crosslinking agent can also be mentioned.

In the method of recovering volatile siloxane distilled away with water vapor in the present invention, the volatile siloxane in a gaseous state is passed through a diatomaceous earth column disclosed in U.S. Pat. No. 5,922,108 or a charcoal filter, and is adsorbed onto it and then desorbed as necessary, to recover the volatile siloxane.

Another preferable recovery method includes a method of recovery by cooling distillate components via a usually known condenser such as a heat exchanger to form a liquid, and then subjecting the liquid to liquid/liquid separation to give a light liquid layer, or recovering volatile siloxane by a liquid adsorption filter, and a further preferable method includes a method of recovery by cooling exhaust gas in the same manner as described above to form a liquid and then cooling the liquid at 17° C. or less to solidify a volatile siloxane component only, followed by the solid-liquid separation such as the filtration, centrifugation and cyclone.

According to this method by solid-liquid separation, volatile siloxane only can be recovered easily and efficiently from water and water-soluble components. The liquid is cooled preferably at 17° C. or less as described above because 1,3,5,7-octamethylcyclotetrasiloxane that is the most abundant component in the volatile siloxane has a melting point of 17.5° C., and the recovery of the volatile siloxane by solid-liquid separation can be effected more stably by cooling more preferably at 10° C. or less, still more preferably at 5° C. or less.

There can thus be provided a novel process for producing a polyorganosiloxane-containing resin composition with reduced volatile siloxane and a method of recovering a volatile siloxane component efficiently from distillate components.

The process of the present invention can be used in combination with a method of using an emulsion prepared by mechanical emulsification of oily polyorganosiloxane obtained according to JP-A 07-330905, JP-A 07-278473, JP-A 06-107796 etc., or with a method of reducing volatile siloxane as disclosed in prior arts such as JP-A 2001-288269, JP-A11-222554, U.S. Pat. Nos. 5,661,215 and 4,600,436, JP-A 2002-249582, JP-A 2002-284877, JP-A 2002-121284 etc., and in this case, polyorganosiloxane-containing resin with a further reduced amount of volatile siloxane can be preferably obtained.

The present invention also discloses polyorganosiloxane-containing resin whose volatile siloxane is reduced by heat-stripping the polyorganosiloxane-containing resin in a slurry state as described above. When the polyorganosiloxane-containing resin is made of a polyorganosiloxane-containing graft copolymer, heat stripping is conducted after conversion of polyorganosiloxane particles into slurry after all chemical reactions such as graft modification are concluded in the process of the present invention, and therefore, as compared with heat stripping of polyorganosiloxane particles in an emulsion state before graft modification, graft sites derived from a graft modifying agent can be utilized effectively in graft polymerization without undergoing change in a quality by heating.

For example, when polyorganosiloxane modified with mercapto groups is used, undesired curing reaction such as intermolecular polyorganosiloxane crosslinkage attributable to the reaction of forming a sulfide linkage between mercapto groups hardly occurs. In the method of heat stripping of the emulsion, the polyorganosiloxane-containing resin is obtained in a dry state such as powder etc. usually via a process that involves heating the resin emulsion, cooling it for coagulation, subjecting it again to heat treatment and drying it, but in the method of heat stripping the slurry in the present invention, heating may be conducted only once.

Accordingly, unexpected and possible heat deterioration of the resulting resin can be prevented, the process of this invention is advantageous in respect of energy and from the viewpoint of productivity, the slurry is maintained at high temperature for a predetermined time to achieve simultaneously an effect of reducing the water content after dehydration, and there is also brought about the advantage of permitting drying to be accomplished with less energy in a shorter time.

The present invention also discloses a flame-retardant comprising the polyorganosiloxane-containing resin. For example, when the polyorganosiloxane-containing resin of the present invention obtained from a polyorganosiloxane-containing graft copolymer latex is compounded with polycarbonate or polycarbonate-based resin such as polycarbonate/polyethylene terephthalate resin (PC/PET), polycarbonate/polybutylene terephthalate resin (PC/PBT) or polycarbonate/acrylonitrile-butadiene-styrene resin (PC/ABS) and then molded, a graft structure is formed well for the reason described above, and thus the polyorganosiloxane-containing resin is dispersed well in the polycarbonate-based resin to confer impact resistance and flame retardancy well.

In the present invention, a resin composition comprising the polyorganosiloxane-containing resin described above and at least one resin selected from thermoplastic resin, thermosetting resin and elastomer is also disclosed and serves also as the polyorganosiloxane-containing resin composition. The polyorganosiloxane-containing resin dispersed well in matrix resin for the same reason described above can be obtained, to confer excellent impact resistance and heat shock properties and to improve brittle temperature.

The elastomer is a concept including thermoplastic elastomer.

Examples of the thermoplastic resin include polycarbonate (PC), polyethylene terephthalate (PET), polybutylene terephthalate (PBT), polyphenylene ether (PPE), polyphenylene sulfide (PPS), polymethyl methacrylate (PMMA), polyarylene, acrylonitrile-butadiene-styrene resin (ABS), acrylonitrile-acrylate-styrene resin (AAS), polyvinylchloride (PVC), polystyrene (PSt), a methyl methacrylate-styrene copolymer (MS), an acrylonitrile-styrene copolymer (AS), nylon, and a mixture thereof.

Examples of the thermosetting resin include, but are not limited to, epoxy resin, phenol resin, urea resin, melamine resin, and polyimide, and examples of the elastomer include acryl rubber such as butyl acrylate, nitrile rubber such as a butadiene-acrylonitrile, chloroprene rubber, natural rubber, butadiene rubber, styrene-butadiene rubber, a methyl methacrylate-butyl acrylate block copolymer, a styrene-isobutylene block copolymer, a styrene-butadiene block copolymer, a hydrogenated styrene-butadiene block copolymer, and polyester elastomer.

The resin composition of the present invention can be compounded if necessary with a pigment, an antioxidant, a anti-dripping reagent, a filler etc.

According to the novel process of the present invention for producing polyorganosiloxane-containing resin, there can be provided polyorganosiloxane-containing resin with a lower content of volatile siloxane and reduced environmental load. Further, a flame-retardant excellent in impact resistance and flame retardancy and a resin composition excellent in impact resistance, heat shock properties and brittle temperature can also be obtained.

EXAMPLES

The present invention is described in more detail by reference to the Examples, but the present invention is not limited thereto. Hereinafter, the term "parts" refers to "parts by weight".

[Solid Content]

A latex or slurry was dried for 2 hours in a hot-air dryer at 130° C., and the solids content was calculated as (weight of residues after drying at 130° C. for 2 hours)/(weight of the original latex or slurry before drying).

[Polymerization Conversion (%)]

Calculated as (total amount of materials charged (parts)×solids content—(amount of emulsifier charged (parts)+amount of inorganic acid and/or organic acid charged (parts)+amount of radical polymerization initiator (parts)+reducing agent (parts)+redox catalyst (parts)))×100/(amount of monomers charged (parts)).

[Volume-average particle diameter]

The volume-average particle diameters of a seed polymer, polyorganosiloxane particles and a graft copolymer were measured respectively in a latex state. Using a measuring instrument MICROTRAC UPA 150 manufactured by Nikkiso Co., Ltd., the volume-average particle diameter ($\mu m$) was measured by a light scattering method.

[Content of Insolubles in Toluene (%)]

A latex was coagulated by adding methanol and then left overnight, and a transparent liquid layer was removed. Additional methanol was added thereto and left overnight, a transparent liquid layer was removed, and the coagulated sample was dried to give a polyorganosiloxane solid. This solid, 0.3 g, was soaked in 100 ml toluene for 40 hours, and after the supernatant was removed, toluene insolubles swollen with toluene were dried. The content of insolubles in toluene was determined as (weight after drying of toluene)×100/(weight before soaking in toluene).

[Weight-Average Molecular Weight (Mw)]

A polyorganosiloxane solid was obtained in the same manner as in determining the content of insolubles in toluene. A chloroform-soluble fraction in this solid was analyzed by gel permeation chromatography (GPC) to determine weight-average molecular weight (Mw). In Gel Permeation Chromatography (GPC) analysis, a GPC system manufactured by Waters Corporation was used, polystyrene gel columns Shodex K-806 and K805 (manufactured by Showa Denko, K. K.) were used, and chloroform was used as an eluting solvent, and the Mw was analyzed based on the calibration by polystyrene.

[Content of Volatile Siloxane]

This content was determined by gas chromatography (GC). Volatile siloxane was extracted by adding methyl ethyl ketone to the latex, resin slurry or powder, and octamethyl trisiloxane was added as an internal standard. Analysis was carried out by gas chromatographic unit GC-14B (manufactured by Shimadzu Corporation) using a column (3 mm$\phi$×3 m) packed with Silicone DC-550, 20 wt % chromosorb WNAW#60-80. The amounts of octamethyltetracyclosiloxane (D4), decamethylcyclopentasiloxane (D5) and dodecamethylcyclohexasiloxane (D6) were analyzed and determined, and the ratio of their total weight to the resin solids content was regarded as the content of volatile siloxane.

[Water Content (%)]

The water content of the resin was determined by drying the resin at 130° C. for 2 hours and calculating (((resin weight before drying)-(resin weight after drying))/(resin weight before drying))×100.

[Impact Resistance]

Evaluated in an Izod test at −10° C. with a notched ⅛ inch bar in accordance with ASTM D-256.

[Flame Retardancy]

Evaluated in an UL94 V test. A test specimen of 1/20 inch (1.2 mm) in thickness was used in evaluation.

Production Example 1

Production of a Seed Polymer (SD-1)

400 parts by weight of water were mixed with 12 parts (as solids) by weight of 10% aqueous sodium dodecylbenzenesulfonate in a 5-necked flask equipped with a stirrer, a reflux condenser, a nitrogen inlet, a monomer inlet and a thermometer, and the solution was heated to 50° C., and after the temperature of the solution reached 50° C., the flask was flushed with nitrogen.

Thereafter, 10 parts by weight of butyl acrylate and 3 parts by weight of t-dodecyl mercaptan were added thereto. After 30 minutes, 0.01 part (as solids) by weight of p-menthane hydroperoxide, 0.3 part by weight of sodium formaldehyde sulfoxylate (SFS), 0.01 part by weight of disodium ethylenediaminetetraacetate (EDTA) and 0.0025 part by weight of ferrous sulfate were added thereto, and the mixture was stirred for 1 hour.

A mixed solution of 90 parts by weight of butyl acrylate, 27 parts by weight of t-dodecylmercaptan and 0.09 part (as solids) by weight of p-menthane hydroperoxide was added continuously thereto over 3 hours.

Thereafter, the mixture was subjected to additional polymerization for 2 hours to give a latex containing a seed polymer (SD-1) having a particle diameter of 0.03 µm and a polymerization conversion of 90% (assuming that t-dodecylmercaptan was a raw component).

Production Examples 2 and 3

Production of Polyorganosiloxane Particles (S-1 and S-2)

A composition shown in Table 1 was stirred at 7500 rpm for 5 minutes to prepare a siloxane emulsion. Separately, the seed polymer (SD-1) latex in the amount (as solids) shown in Table 1 was introduced into a 5-necked flask equipped with a stirrer, a reflux condenser, a nitrogen inlet opening, a monomer inlet opening and a thermometer. The above emulsion was introduced all at once into this flask. While the mixture was stirred in a nitrogen stream, 1 part (solids content) by weight of 10% aqueous dodecylbenzenesulfonic acid (DBSA) solution was added thereto and then heated to 80° C.

After 80° C. was reached, the mixture was reacted for 15 hours, then cooled to 25° C. and left for 20 hours, and the pH of the system was adjusted to 6.5 with 3% aqueous sodium hydroxide to terminate the polymerization, whereby latexes containing polyorganosiloxane particles (S-1, S-2) were obtained respectively.

The measurement results of the polymerization conversion, the volume-average particle diameter of the latex of polyorganosiloxane particles, the content of insolubles in toluene, the weight-average molecular weight (Mw) and the content of volatile siloxane are shown in Table 1.

TABLE 1

| | | | Production Example | | | |
|---|---|---|---|---|---|---|
| | | | 2 | 3 | 4 | 5 |
| Polyorganosiloxane particles | | | S-1 | S-2 | S-3 | S-4 |
| Seed polymer | SD-1 | parts | — | 2 | — | 2 |
| Siloxane emulsion | Deionized water | parts | 300 | 300 | 300 | 300 |
| | SDBS | parts | 0.5 | 0.5 | 0.5 | 0.5 |
| | D4 | parts | 96 | 94 | 96 | 94 |
| | DSMA | parts | 4 | — | 4 | — |
| | MPrDMS | parts | — | 4 | — | 4 |
| Polymerization catalyst | DBSA | parts | 1 | 1 | 1 | 1 |
| Emulsion stripping | Temperature | ° C. | — | — | | |
| | Treatment time | hour | — | — | | |
| Degree of polymerization conversion | | | 85% | 86% | 85% | 86% |
| Volume-average particle diameter | | µm | 0.18 | 0.23 | 0.18 | 0.23 |
| Content of insolubles in toluene | | | 0% | 0% | 0% | 7% |
| Weight-average molecular weight (Mw) | | ×10³ | 160 | 170 | 87 | 103 |
| Content of volatile siloxane | | | 16% | 15% | 3.9% | 4.2% |

SDBS: sodium dodecylbenzenesulfonate
DBSA: dodecylbenzenesulfonic acid
D4: 1,3,5,7-octamethylcyclotetrasiloxane
DSMA: 3-methacryloyloxypropyldimethoxymethylsilane
MPrDMS: 3-mercaptopropyldimethoxymethylsilane Production Examples 4 and 5

Production of Polyorganosiloxane Particles (S-3 and S-4)

1 kg latex containing polyorganosiloxane particles (S-1, S-2) was introduced into a pressure-resistant vessel equipped with a heating jacket, a stirrer, a reflex condenser provided with a vessel capable of collecting a condensed liquid, a steam inlet arranged on the bottom, a pressure gauge, and a thermometer.

Then 0.05 part by weight of an ethylene oxide (22% content)-propylene oxide block copolymer (trade name: Pronone 102 manufactured by Nippon Oil & Fats Co., Ltd.) was added to 100 parts (in terms of solids content) by weight of the latex as an anti-foaming agent. Water vapor was fed at a rate of 3 kg/hour, and when the temperature was reached to 140° C., stripping was initiated. While the amount of distillate gas was controlled so as to maintain the temperature of the solution at 140 to 150° C., stripping was conducted for 30 minutes to give latices containing polyorganosiloxane particles (S-3, S-4) respectively.

The measurement results of the polymerization conversion, the volume-average particle diameter of the latex of polyorganosiloxane particles, the content of insolubles in toluene, the weight-average molecular weight (Mw) and the content of volatile siloxane are shown in Table 1 (parts: parts by weight).

mers (SG-1, SG-2) were obtained respectively. The measurement results of the polymerization conversion of all graft monomers (total in the first and second stages), the volume-average particle diameter of the latex, and the content of volatile siloxane are shown in Table 2 (parts:parts by weight).

TABLE 2

|  |  |  | Production Example | | | | | |
|---|---|---|---|---|---|---|---|---|
|  |  |  | 6 | 7 | 8 | 9 | 10 | 11 |
| Polyorganosiloxane-containing graft copolymer |  |  | SG-1 | SG-2 | SG'-1 | SG'-2 | SG'-3 | SG'-4 |
| Polyorganosiloxane particles | S-1 | parts | 80 | — | — | — | 80 | — |
|  | S-2 | parts | — | 80 | — | — | — | 80 |
|  | S-3 | parts | — | — | 80 | — | — | — |
|  | S-4 | parts | — | — | — | 80 | — | — |
| Polymerization temperature |  | ° C. | 45 | 60 | 45 | 60 | 45 | 60 |
| Graft monomer in first stage (MG-1) | AIMA | parts | — | 4 | — | 4 | — | 4 |
|  | TBPIPC | parts | — | 0.1 | — | 0.1 | — | 0.1 |
| Graft monomer in second stage (MG-2) | MMA | parts | 20 | 16 | 20 | 16 | 20 | 16 |
|  | TBPIPC | parts | — | 0.2 | — | 0.2 | — | 0.2 |
|  | CHP | parts | 0.05 | — | 0.05 | — | 0.05 | — |
| Emulsion stripping | Temperature | ° C. | — | — | — | — | 140-150 | 140-150 |
|  | Treatment time | hour | — | — | — | — | 0.5 | 0.5 |
| Degree of polymerization conversion (graft monomers only) |  |  | 99% | 100% | 100% | 100% | 99% | 100% |
| Volume-average particle diameter |  | μm | 0.19 | 0.23 | 0.19 | 0.23 | 0.19 | 0.23 |
| Content of volatile siloxane |  |  | 14% | 12% | 4.3% | 3.2% | 4.1% | 3.5% |

AIMA: allylmethacrylate
MMA: methylmethacrylate
TBPIPC: t-butylperoxyisopropyl carbonate
CHP: cumenehydroperoxide Production Examples 6 and 7

Production of Polyorganosiloxane-Containing Graft Copolymers (SG-1 and SG-2)

240 parts by weight of purified water (including water from the polyorganosiloxane particle-containing latex) and the polyorganosiloxane particles (S-1, S-2) obtained in Production Examples 2 and 3, in the amount (as solids) shown in Table 2, were introduced into a 5-necked flask equipped with a stirrer, a reflux condenser, a nitrogen inlet tube, a monomer inlet and a thermometer, and the mixture was heated under stirring to the temperature shown in Table 2 in a nitrogen stream.

One hour after the temperature shown in Table 2 was reached, 0.2 part by weight of sodium formaldehyde sulfoxylate (SFS), 0.01 part by weight of disodium ethylenediaminetetraacetate (EDTA), and 0.0025 part by weight of ferrous sulfate were added thereto, and a graft monomer mixture (MG-1) with the composition shown in Table 2 was added all at once, and the mixture was stirred for 1 hour at the temperature shown in Table 2.

Thereafter, an additional graft monomer mixture (MG-2) with the composition shown in Table 2 was added dropwise thereto over 1 hour, and after the end of this addition, the mixture was continued to stir for additional 2 hours, whereby latices of the polyorganosiloxane-containing graft copoly- Production Examples 8 and 9.

Production of Polyorganosiloxane-Containing Graft Copolymers (SG'-1 and SG'-2)

Polyorganosiloxane-containing graft copolymers (SG'-1, SG'-2) were obtained in the same manner as in Production Examples 6 and 7 except that the latices containing the polyorganosiloxane particles (S-3, S-4) were used in place of the latices containing the polyorganosiloxane particles (S-1, S-2). The measurement results of the polymerization conversion of all graft monomers, the volume-average particle diameter of the latex, and the content of volatile siloxane are shown in Table 2.

Production Examples 10 and 11.

Production of Polyorganosiloxane-Containing Graft Copolymers (SG'-3 and SG'-4)

1 kg of the same latex as obtained in Production Examples 6 and 7 was introduced into a pressure-resistant vessel equipped with a heating jacket, a stirrer, a reflex condenser provided with a vessel capable of collecting a condensed liquid, a steam inlet arranged on the bottom, a pressure gauge, and a thermometer. Then 0.05 part by weight of an ethylene oxide (22% content) propylene oxide block copolymer (trade name: Pronone 102 manufactured by Nippon Oil & Fats Co., Ltd.) was added to 100 parts (in terms of solids content) by weight of the latex as an anti-foaming agent.

Water vapor was fed at a rate of 3 kg/hour, and when the temperature was reached to 140° C., stripping was initiated. While the amount of distillate gas was controlled so as to maintain the temperature of the solution at 140 to 150° C., stripping was conducted for 30 minutes to give latices containing polyorganosiloxane-containing graft copolymers (SG'-3, SG'-4) respectively. The results are shown in Table 2.

Examples 1 and 2

Slurry stripping of the polyorganosiloxane-containing graft copolymers (SG-1 and SG-2)

The resulting test specimens were evaluated according to the evaluation methods described above. The results are shown in Table 3.

TABLE 3

| | | | Example | | | | | |
|---|---|---|---|---|---|---|---|---|
| | | | 1 | 2 | 3 | 4 | 5 | 6 |
| Polyorganosiloxane-containing resin | | | SG-1 | SG-2 | SG-2 | SG-2 | SG-2 | SG-2 |
| Stripping conditions | Temperature | ° C. | 140-150 | 140-150 | 140-150 | 110-120 | 110-120 | 140-150 |
| | Treatment time | hour | 0.5 | 0.5 | 1 | 0.5 | 1 | 0.5 |
| | Internal pressure | Mpa | 0.26-0.36 | 0.26-0.36 | 0.26-0.36 | 0.10-0.11 | 0.10-0.11 | 0.26-0.36 |
| Content of volatile siloxane | | | 5.0% | 4.8% | 5.1% | 9.1% | 7.5% | 5.2% |
| Water content of dehydrated cake | | | 41% | 39% | 35% | 50% | 47% | 42% |
| Amount of recovered siloxane | | | 7.7% | 6.0% | 5.8% | 2.6% | 3.9% | 3.9% |
| Flame retardancy (1/20 inch) | Total combustion time | sec. | 49 | 44 | 48 | 39 | 42 | 45 |
| | Dripping | number of times | 0 | 0 | 0 | 0 | 0 | 0 |
| Impact resistance (Izod strength) | −10° C. | kJ/m$^2$ | 29 | 31 | 28 | 33 | 31 | 29 |

Each of the latices of the polyorganosiloxane-containing graft copolymers (SG-1 and SG-2) obtained in Production Examples 6 and 7 was diluted with water and adjusted to a solids content of 15%, and then 4 parts (as solids) by weight of 2.5% aqueous calcium chloride were added thereto to give coagulated slurry. This slurry was further diluted with water and adjusted to a solids content of 10% by weight. 1 kg of this slurry was introduced into a pressure-resistant vessel equipped with a heating jacket, a stirrer, a reflex condenser provided with a vessel capable of collecting a condensed liquid, a steam inlet arranged on the bottom, a pressure gauge, and a thermometer, and water vapor was fed at a rate of 3 kg/hour.

When the temperature of the solution reached 145° C., stripping was initiated. While the amount of distillate gas was controlled so as to maintain the temperature of the solution at 140 to 150° C., stripping was conducted for 30 minutes, and then the slurry remaining there in was discharged. Thereafter, the slurry was dehydrated to give a dehydrated cake. During stripping, volatile siloxane distillate together with water vapor was condensed and collected in the reflux condenser, during which the collection vessel was cooled at 5° C.

After stripping was finished, the temperature of the solution in the collection vessel was confirmed to be 10° C. or less, and then the solution was filtered to recover the volatile siloxane. The content of the volatile siloxane contained in the dehydrated slurry, the water content of the dehydrated cake, and the amount of the volatile siloxane recovered (ratio of the volatile siloxane to the solids in the slurry) are shown in Table 3.

Then, the dehydrated cake was dried, and the resulting powder, 3 parts by weight, was compounded with 100 parts by weight of polycarbonate resin (trade name: Tarflon FN1700A, manufactured by Idemitsu Petrochemical Co., Ltd.) together with 0.4 part of polytetrafluoroethylene (trade name: Polyflon FA-500, manufactured by Daikin Industries, Ltd.). The resulting composition was melt-kneaded at 270° C. by a twin-screw extruder (TEX44 SS manufactured by NIHONSEIKO CO., LTD) to produce pellets. The resulting pellets were formed into 1/8-inch Izod test specimens and 1/20-inch test specimens for flame retardancy examination, by FAS100B injection molding machine (manufactured by FANUC) set at a cylinder temperature of 300° C.

Examples 3 to 5

The same procedures as in Example 2 were repeated except that the temperature and time in stripping treatment of the slurry were changed as shown in Table 3. The results are shown in Table 3.

Example 6

The same procedure as in Example 2 was repeated except that while volatile siloxane distillate together with water vapor was condensed in the reflux condenser during stripping, the collection vessel was cooled at 25° C., the liquid in the collection vessel after stripping was left overnight at the same temperature and then supernatant oily matter was recovered. The results are shown in Table 3.

Reference Examples 1 and 2

Each of the latices of the polyorganosiloxane-containing graft copolymers (SG-1, SG-2) obtained in Production Examples 6 and 7 was diluted with water and adjusted such that the solids content was reduced to 15%, and then 4 parts (as solids content) by weight of 2.5% aqueous calcium chloride were added thereto to give coagulated slurry. This slurry was further diluted with water and adjusted such that the solids content was reduced to 10%. This slurry was heated under stirring to 95° C. in a stainless steel pot, and heating at 95° C. was continued for 30 minutes. Thereafter, the slurry was dehydrated to give a dehydrated cake.

The content of volatile siloxane contained in the dehydrated cake and the water content of the dehydrated cake are shown in Table 4. Volatile siloxane could not be recovered.

The resulting dehydrated cake was dried, then compounded with polycarbonate resin, molded and evaluated in the same manner

Reference Examples 3 and 4

The same procedures as in Reference Examples 1 and 2 were repeated except that the polyorganosiloxane-containing graft copolymers (SG'-1, SG'-2) obtained in Production Examples 8 and 9 were used in place of the latices of the polyorganosiloxane-containing graft copolymers (SG-1, SG-2) obtained in Production Examples 6 and 7. The results are shown in Table 4.

Reference Examples 5 and 6

The same procedures as in Reference Examples 1 and 2 were repeated except that the polyorganosiloxane-containing graft copolymers (SG'-3, SG'-4) obtained in Production Examples 8 and 9 were used in place of the latices of the polyorganosiloxane-containing graft copolymers (SG-1, SG-2) obtained in Production Examples 6 and 7. The results are shown in Table 4.

TABLE 4

|  |  |  | Reference Example 1 | Reference Example 2 | Reference Example 3 | Reference Example 4 | Reference Example 5 | Reference Example 6 |
|---|---|---|---|---|---|---|---|---|
| Polyorganosiloxane-containing resin |  |  | SG-1 | SG-2 | SG'-1 | SG'-2 | SG'-3 | SG'-4 |
| Heat treatment conditions | Temperature | °C. | 95 | 95 | 95 | 95 | 95 | 95 |
|  | Treatment time | hour | 0.5 | 0.5 | 0.5 | 0.5 | 0.5 | 0.5 |
|  | Internal pressure | Mpa | — | — | — | — | — | — |
| Content of volatile siloxane |  |  | 11% | 10% | 2.0% | 2.0% | 2.6% | 3.3% |
| Water content of dehydrated cake |  |  | 61% | 58% | 60% | 64% | 66% | 59% |
| Amount of recovered siloxane |  |  | — | — | 9.1% | 9.3% | 8.3% | 7.9% |
| Flame retardancy (1/20 inch) | Total combustion time | sec. | 46 | 42 | 77 | 108 | 53 | 56 |
|  | Dripping | number of times | 0 | 0 | 0 | 3 | 1 | 0 |
| Impact resistance (Izod strength) | −10° C. | kJ/m$^2$ | 30 | 33 | 25 | 18 | 32 | 28 |

In the table, SDBS indicates sodium dodecylbenzenesulfonate; DBSA, dodecylbenzenesulfonic acid; D4, 1,3,5,7-octamethylcyclotetrasiloxane; DSMA, methacryloyloxypropyldimethoxymethylsilane; MPrDMS, mercaptopropyldimethoxymethylsilane; MMA, methyl methacrylate; AlMA, allyl methacrylate; TBPIPC, t-butyl-peroxyisopropyl carbonate; and CHP, cumene hydroperoxide.

As can be seen from the above results, the volatile siloxane contained in the dehydrated cake of the polyorganosiloxane-containing resin obtained by the process of the present invention is reduced. It was also revealed that the water content of the dehydrated cake is reduced. That is, this means that dissipation of volatile siloxane and load for drying are reduced in a subsequent drying process. Further, it can also be seen that volatile siloxane can be recovered well by the method of separating volatile siloxane from distillate components in the present invention.

It was also revealed that a polycarbonate resin compounded with the polyorganosiloxane-containing resin obtained by the process of the present invention has the above properties, is superior significantly in flame retardancy and in strength when compared to the resin having been subjected in a latex state to stripping (Reference Examples 3 to 6), and has the same excellent balance between flame retardancy and impact resistance as that of the resin not subjected to stripping (Reference Examples 1 and 2).

INDUSTRIAL APPLICABILITY

There is provided a novel process for producing polyorganosiloxane-containing resin in order to reduce and recover volatile siloxane. According to the process of the present invention, load for drying such as heat energy necessary for recovering polyorganosiloxane-containing resin finally as powder is low, and the environmental load with volatile siloxane in exhaust gas is suppressed. Simultaneously, the resulting polyorganosiloxane-containing resin is prevented from undergoing thermal deterioration at the time of production, and thus unexpected deterioration in qualities hardly occurs, and for example, the polyorganosiloxane-containing resin upon compounded with polycarbonate resin can achieve good balance between flame retardancy and impact resistance.

The invention claimed is:

1. A process for producing polyorganosiloxane-containing resin, comprising heat stripping a polyorganosiloxane-containing resin in a slurry state to remove volatile siloxane and obtain a polyorganosiloxane containing resin wherein the polyorganosiloxane-containing resin is a polyorganosiloxane-based graft copolymer obtained by polymerizing monofunctional and/or multifunctional radical polymerizable monomers in one or more steps in the presence of polyorganosiloxane-based particles.

2. The process for producing polyorganosiloxane-containing resin according to claim 1, wherein the polyorganosiloxane-containing resin in a slurry state is obtained by coagulating polyorganosiloxane-containing resin in a latex state.

3. The process for producing polyorganosiloxane-containing resin according to claim 1, which comprises heat stripping at 100° C. or more.

4. The process for producing polyorganosiloxane-containing resin according to claim 1, which involves feeding water vapor to the slurry.

5. The process for producing polyorganosiloxane-containing resin according to claim 1, wherein the volatile siloxane is separated by cooling volatile siloxane-containing distillate components.

6. The process for producing polyorganosiloxane-containing resin according to claim 5, wherein the volatile siloxane is separated by cooling volatile siloxane-containing distillate components to 17° C. or less.

7. The process for producing polyorganosiloxane-containing resin according to claim 6, wherein the volatile siloxane upon separation is separated as solid.

* * * * *